UNITED STATES PATENT OFFICE.

GEORG WICHMANN, OF BERLIN, GERMANY, ASSIGNOR TO CHEMISCHE FABRIK AUF ACTIEN, (VORM. E. SCHERING,) OF BERLIN, GERMANY.

ALBUMOSE-SILVER-AMMONIO PRODUCT.

1,002,548. Specification of Letters Patent. Patented Sept. 5, 1911.

No Drawing. Application filed June 17, 1910. Serial No. 567,412.

*To all whom it may concern:*

Be it known that I, GEORG WICHMANN, chemist, doctor of philosophy, citizen of the German Empire, residing at Berlin, Kingdom of Prussia, German Empire, have invented a new and useful Improvement in Albumose - Silver - Ammonio Products, of which the following is a specification.

The application Serial No. 484,268 describes new alkaline albumose silver compounds produced by the action of albumose upon the double compounds obtained from silver salts and organic bases such as ethylene diamin, piperazin and the like. I have now discovered that very useful albumose silver compounds are obtained if in place of the double compounds of silver salts and organic bases there are employed silver-ammonio compounds (see Dammers *Handbuch der Anorganischen Chemie*, Vol. 2, pages 801, 803, 812, 814 and 822).

In general the new products which contain masked silver, are obtained by causing albumose to react upon silver-ammonio compounds. The albumose employed for the production of this new compound is soluble in water and insoluble in alcohol and is obtained by the action of a digestive ferment, such as pepsin or pancreatin, or a suitable acid, or superheated water upon albumin which is derived from meat and is soluble in water. For instance albumose or its solution is added to an aqueous solution of the silver-ammonio compound, the solution preferably filtered and evaporated to dryness *in vacuo* or precipitated by suitable reagents.

Examples.

1. *Silver-nitrate-ammonio-albumose.* — In order to produce a solution of $AgNO_3 + 2NH_3$ 23 liters of normal ammonia solution are added to 11.5 liters of a normal silver nitrate solution. By dissolving 15.4 kilograms of albumose therein, and concentrating *in vacuo* a brown precipitate of silver-nitrate-ammonio-albumose is obtained which contains about 7 per cent. of metallic silver. This compound is easily soluble in water with an alkaline reaction.

2. *Silver-sulfate-ammonio-albumose.* — 1.8 kilograms silver sulfate are dissolved in 46 liters of normal ammonia solution. 15 kilograms albumose are added thereto and the mixture stirred until solution is complete; the solution is then filtered, and evaporated *in vacuo* at a low temperature to dryness.

3. *Silver-phosphate-ammonio-albumose.* — 2 kilograms silver nitrate in aqueous solution are precipitated by the addition of a solution of sodium phosphate. The precipitate is after separation by suction and washing dissolved in an excess of ammonio, 8.8 kilograms of albumose are added, the insoluble residue removed by filtration and the solution evaporated to dryness *in vacuo*.

4. *Silver - oxid - ammonio - albumose.* — 2 kilograms $AgNO_3$ in aqueous solution are precipitated with caustic soda; the oxid after having been washed with water is dissolved in ammonia and then stirred for a long time with 15 kilograms albumose, filtered and brought to dryness *in vacuo*.

5. *Silver-carbonate-ammonio-albumose.* — The moist silver oxid obtained in the previous example is while suspended in water transformed into carbonate by carbonic acid. By the addition of 25 liters of normal ammonia solution, a solution is obtained which is stirred with 15 kilograms albumose. A small insoluble residue is removed by filtration and the solution is evaporated *in vacuo*.

6. *Silver-chlorid-ammonio-albumose.* — 12 liters of a normal salt solution are added to 12 liters of a normal silver nitrate solution. The precipitated silver chlorid is repeatedly washed with water and then dissolved in about 15 liters ammonia solution. 15 kilograms albumose are dissolved therein and the whole evaporated to dryness.

The new products may also be made by dissolving albumose in ammonia adding the salt of silver and then evaporating or precipitating. For example in order to manufacture silver - nitrate - ammonio - albumose 15.4 kilograms albumose are dissolved in 23 liters of normal ammonia solution, slowly adding to the solution while stirring 11.5 liters of normal silver nitrate solution and evaporating *in vacuo*.

The products obtained in this manner are light to dark brown in color and contain about 7 per cent. of metallic silver. On heating to 100 centigrade they become gradually darker and carbonize at a higher temperature. They dissolve in one to two parts of water to a syrup like liquid which froths on stirring; the liquid can be thinned with any desired quantity of water and has an alkaline reaction. The aqueous solution does not even on warming coagulate solutions of albumin. No precipitate takes place either on the addition of a solution of ammonium sulfid or of common salt. Hydrochloric acid gives a precipitate which is again dissolved with a large excess. On distilling with caustic alkalis the aqueous solution gives off the ammonia.

I claim as my invention:

1. As a new product, the herein described combination of a silver-ammonio compound and albumose which is soluble in water and insoluble in alcohol, the same being a brownish powder which contains the silver in a masked state, dissolves easily in water with alkaline reaction, and gives off the ammonia on distilling the aqueous solution with a caustic alkali, substantially as set forth.

2. As a new product, the herein described silver-nitrate-ammonio-albumose, the same being a brownish powder which contains seven per cent. of metallic silver in a masked state, dissolves easily in water with alkaline reaction, and gives off the ammonia on distilling the aqueous solution with a caustic alkali, substantially as set forth.

3. The herein described process of manufacturing the herein described combinations of a silver-ammonio compound and albumose, which consists in causing albumose which is soluble in water and insoluble in alcohol to react upon a silver-ammonio compound, substantially as set forth.

4. The herein described process of manufacturing the herein described silver-nitrate-ammonio-albumose, which consists in causing albumose which is soluble in water and insoluble in alcohol to react upon silver-nitrate-ammonia, substantially as set forth.

In testimony whereof I hereunto set my hand in the presence of two subscribing witnesses.

GEORG WICHMANN.

Witnesses:
 HENRY HASPER,
 WOLDEMAR HAUPT.

---

Copies of this patent may be obtained for five cents each, by addressing the "Commissioner of Patents, Washington, D. C."